United States Patent
Saccavini et al.

(10) Patent No.: US 10,306,715 B2
(45) Date of Patent: May 28, 2019

(54) ASSEMBLY WITH CONTROL GEAR FOR LAMPS

(71) Applicant: TRIDONIC GMBH & CO KG, Dornbirn (AT)

(72) Inventors: Lukas Saccavini, Dornbirn (AT); John Schönberger, Reichenburg (CH)

(73) Assignee: TRIDONIC GMBH & CO KG, Dornbirn (AT)

( * ) Notice: Subject to any disclaimer, the term of this patent is extended or adjusted under 35 U.S.C. 154(b) by 0 days.

(21) Appl. No.: 15/753,447

(22) PCT Filed: Aug. 19, 2016

(86) PCT No.: PCT/AT2016/060034
§ 371 (c)(1),
(2) Date: Feb. 19, 2018

(87) PCT Pub. No.: WO2017/035548
PCT Pub. Date: Mar. 9, 2017

(65) Prior Publication Data
US 2018/0249539 A1    Aug. 30, 2018

(30) Foreign Application Priority Data

Aug. 31, 2015   (DE) .................... 20 2015 104 608 U
Dec. 21, 2015   (AT) ................................ GM378/2015

(51) Int. Cl.
*H02J 5/00*       (2016.01)
*H04B 5/00*       (2006.01)
(Continued)

(52) U.S. Cl.
CPC .......... *H05B 33/0815* (2013.01); *H02J 5/005* (2013.01); *H02J 50/10* (2016.02);
(Continued)

(58) Field of Classification Search
CPC . H01F 38/14; H02J 5/005; H02J 50/10; H02J 50/40; H02J 17/00; H02J 50/12; H02J 50/50; H02J 50/60; H02J 50/70; H02J 50/80; H02J 50/90; H02J 7/025; H02M 3/33507; H05B 33/0803; H05B 33/0815;
(Continued)

(56) References Cited

U.S. PATENT DOCUMENTS 9,218,902 B2    12/2015  Volker et al.
2007/0236159 A1*  10/2007  Beland ............... H05B 33/0803
                                                    315/312
(Continued)

FOREIGN PATENT DOCUMENTS

AT            14261         7/2015
DE        102012109911      4/2013
(Continued)

OTHER PUBLICATIONS

STMicroelectronics—Initial release Jun. 24, 2011 M24LR16E-R "Dynamic NFC/RFID tag IC with 16-Kbit EEPROM, energy harvesting, I²C bus and ISO 15693 RF interface".*

Primary Examiner — Alexander H Taningco
Assistant Examiner — Renan Luque
(74) Attorney, Agent, or Firm — Andrus Intellectual Property Law

(57) ABSTRACT

The invention relates to an assembly which consists of control gear for lamps and an electric circuit, said control gear comprising at least one energy transmission element, for example a transformer. The electric circuit has an inductive coupling element arranged in a stray magnetic field of the energy transmission element. The electric circuit comprises a voltage supply unit designed to produce a supply (Continued)

voltage for the electric circuit from energy absorbed from the stray magnetic or electromagnetic field of the energy transmission element.

6 Claims, 4 Drawing Sheets

(51) Int. Cl.
| | |
|---|---|
| *H01F 38/14* | (2006.01) |
| *H02J 50/10* | (2016.01) |
| *H02J 50/70* | (2016.01) |
| *H02J 50/80* | (2016.01) |
| *H02J 50/90* | (2016.01) |
| *H05B 33/08* | (2006.01) |

(52) U.S. Cl.
CPC .............. *H02J 50/70* (2016.02); *H02J 50/80* (2016.02); *H02J 50/90* (2016.02); *H04B 5/0025* (2013.01); *H04B 5/0037* (2013.01); *H04B 5/0081* (2013.01); *H05B 33/0887* (2013.01); *H01F 38/14* (2013.01)

(58) Field of Classification Search
CPC ............ H05B 33/0893; H05B 37/0209; H05B 37/0227; H05B 37/0254; H05B 37/0272; H05B 33/0887; Y02B 20/346; H04B 5/0037; H04B 5/0081; H04B 5/0093
See application file for complete search history.

(56) References Cited

U.S. PATENT DOCUMENTS

| | | | |
|---|---|---|---|
| 2009/0159677 A1 | 6/2009 | Yakimov et al. | |
| 2009/0284179 A1 | 11/2009 | Johnstone et al. | |
| 2010/0039234 A1* | 2/2010 | Soliven ............... | H04B 5/02 340/10.1 |
| 2010/0130126 A1* | 5/2010 | Takayama ............ | H04B 5/0031 455/41.1 |
| 2012/0212150 A1* | 8/2012 | Lakirovich .......... | H05B 33/086 315/250 |
| 2012/0235636 A1* | 9/2012 | Partovi ................ | H02J 7/025 320/108 |
| 2013/0099676 A1 | 4/2013 | Hyoung et al. | |
| 2014/0191568 A1* | 7/2014 | Partovi ................ | H02J 7/025 307/9.1 |
| 2014/0302782 A1* | 10/2014 | Raab .................... | H04B 5/0037 455/41.1 |
| 2016/0057838 A1* | 2/2016 | Maros ................. | H05B 37/0272 315/291 |
| 2016/0127011 A1* | 5/2016 | Phillips ............... | H04B 5/0037 455/41.1 |
| 2017/0048937 A1* | 2/2017 | Wang ................... | H01F 38/14 |

FOREIGN PATENT DOCUMENTS

| | | | |
|---|---|---|---|
| DE | 102012102398 | 9/2013 | |
| EP | 2806528 | 11/2014 | |
| FR | 2955011 | 7/2011 | |
| WO | 2008012702 | 1/2008 | |
| WO | WO 2015162081 A2 * | 10/2015 | ............ H01F 38/14 |

* cited by examiner

ASSEMBLY WITH CONTROL GEAR FOR LAMPS

CROSS REFERENCE TO RELATED APPLICATION

The present application is the U.S. national stage application of International Application PCT/AT2016/060034, filed Aug. 19, 2016, which international application was published on Mar. 9, 2017 as International Publication WO 2017/035548 A1. The International Application claims priority to German Patent Application 20 2015 104 608.1, filed Aug. 31, 2015, and Austria Patent Application GM378-2015 filed Dec. 21, 2015.

FIELD OF THE INVENTION

The invention relates to an assembly comprising control gear for lamps and an electric circuit, which receives a galvanically separated voltage supply from an energy transmission element of the control unit.

BACKGROUND OF THE INVENTION

Control gear, also referred to as ballast or operating device, are used for operating lamps such as light emitting diodes (LEDs) or fluorescent lamps. The control gear is configured to generate the necessary supply voltage for the lamps from a mains supply voltage, while also satisfying safety requirements. Further electrical circuits are used in conjunction with the control gear and the lamps.

These other electrical circuits can comprise sensors, such as movement sensors or brightness sensors. Operation of these sensors requires access to a supply voltage for the respective sensors. The sensors can be used, for example, for measuring physical parameters, which then send the recorded parameters to the control gear as an electrical sensor signal.

Appropriate supply lines are necessary for supplying a sensor with electricity, and additional circuits that require an energy supply are frequently needed for controlling the sensor and for external communication therewith. Normally, a converter used in the framework of the control gear generates the necessary low-voltage supply voltage supplied to the sensor via supply lines. Additional expenditure is required within the converter for generating this low-voltage supply voltage, comprising additional external connections, such as plug-in connectors, and additional supply lines between the converter and the sensor, as well as additional connecting lines for transmitting sensor data to the control gear. Alternatively, control gear inductors, in particular a transformer, normally a copper foil, are enveloped therein, to control the unavoidable stray fields. The power of these stray fields thus remains unused.

On the basis of the prior art described in the introductory portion of this description, the invention addresses the technological problem of improving the use of external circuits and control gear for lamps in a compact assembly, and improving the overall efficiency by using the energy contained in the stray fields.

SUMMARY OF THE INVENTION

The problem is solved by an assembly comprising control gear for lamps and an electric circuit, wherein the control gear comprises at least one energy transmission element. An inductive coupling element of the electric circuit is disposed according to the invention in a magnetic or electromagnetic stray field of the energy transmission element. By way of example, the energy transmission element is configured as an inductive element.

A voltage supply for an electric circuit, disposed externally to the control gear, is provided by the assembly according to the invention, wherein no additional wiring from the control gear to the circuit is needed for the voltage supply. The connecting expenditures, such as plug-in connectors, mechanical conductors through a housing of the control gear, cables, and cable guides, are reduced by the invention. This enables a contactless energy transfer to the electric circuit.

At the same time, it is possible to galvanically separate a low-voltage voltage circuit for the electric circuit and an input-side mains voltage segment of the control gear. In this manner, requirements regarding protection from high voltages can be easily fulfilled without additional expenditure.

The use of the stray field of an existing control gear inductance for tasks other than the voltage supply for the circuit reduces expenditures by eliminating additional components in the control gear, e.g. a converter, with regard to the number of components and the necessary dimensions of the device. The inductive element of the control gear can specifically be a mains input inductor, a primary winding of a transformer, a coil of a flyback converter, etc., the stray field of which is used according to the invention. Moreover, by absorbing the stray capacity, a foil normally encompassing the inductor is no longer needed.

According to an advantageous further development of the assembly according to the invention, the electric circuit comprises a voltage supply means configured for generating a supply voltage for the electric circuit from the energy that is obtained from the magnetic or electromagnetic stray field.

The magnetic coupling element obtains energy from the magnetic or electromagnetic stray field, an alternating field, through induction in a coupling element conductor, and supplies this energy in the form of an alternating current (AC voltage). This induced alternating current can be rectified by means of the voltage supply means, and used, e.g., as a low-voltage supply voltage for a sensor.

According to a preferred embodiment of the assembly according to the invention, the electric circuit has a storage means, in particular a capacitor, for storing electrical energy.

A nearly constant low-voltage DC voltage can be supplied for operating, e.g., a control circuit, a microcontroller, or an application specific integrated circuit (ASIC), by means of the storage means. By using a suitable capacitor as the storage means, it is also possible to continuously operate the circuit for a pulsed mode of the control gear.

The assembly according to another embodiment is distinctive in that the electric circuit comprises a sensor, in particular a movement sensor or brightness sensor, and/or a communication interface, preferably for wireless communication, and the energy transmission element is activated in a pulsed operating mode. The field energy obtained via the magnetic coupling element is temporarily stored in the storage means, and is available for a movement sensor used for activating a lamp.

Another exemplary embodiment of the assembly comprises an electric circuit that has a first communication means, configured for communication with the control gear. A signal, in particular a sensor signal or data signal of the electric circuit, is sent to the control gear by means of the first communication means of the electric circuit. In this manner, a communication channel can be easily implemented between the control gear and the electric circuit.

The first communication means in a preferred embodiment of the assembly according to the invention preferably has a modulator, configured for pulsing the inductive coupling element and/or a transmitting inductor.

According to an advantageous further development of the assembly according to the invention, the first communication means communicates with the control gear by modifying a load of the inductive coupling element.

If the first communication means is configured in this manner, then special signal lines between the electric circuit and the control gear are not needed, and the complexity of the circuit technology is reduced for the voltage supply and the signal and/or data communication.

In the assembly according to another exemplary embodiment, the control gear has a second communication means, which is configured to communicate with the first communication means of the electric circuit.

According to a further development, the control gear is distinctive in that it comprises a housing and a housing lid, wherein the electric circuit is disposed outside the housing, or on the housing of the control gear.

In one exemplary embodiment of the assembly according to the invention, the inductive coupling element of the electric circuit is formed on the housing lid, or integrated in the housing lid.

By supplying the electric circuit via a magnetic coupling, the electric circuit can be disposed outside the housing of the control gear. As a result, it is possible to easily expand and/or modify the functionality of the control gear by adding an appropriately configured electric circuit, or repairing and/or replacing the circuit. The actual control gear remain unchanged thereby.

The housing lid in an advantageous further development has at least one marking for indicating a position of the inductive coupling element on the housing lid.

The marking enables a precise positioning of the magnetic coupling element in relation to the energy transmission element. An optimal positioning of the magnetic coupling element and the energy transmission element, and thus a maximum energy extraction from the magnetic or electromagnetic stray field, can therefore also be achieved when the electric circuit is attached to the housing lid later.

One assembly according to an exemplary embodiment is distinctive in that the inductive coupling element, together with the inductive element, exerts a magnetic force on the electric circuit toward the housing lid.

The use of the magnetic force allows the electric circuit to adhere better to the housing lid, if applicable, in addition to securing it by means of screws, adhesive, etc.

According to a preferred exemplary embodiment of the assembly according to the invention, the inductive element is at least a part of an LLC transformer of the control gear and/or an inductor of a converter of the control gear.

The use of existing and technically necessary inductances of the control gear and its magnetic or electromagnetic stray field makes it possible to supply energy to an external electric circuit without additional expenditures on the part of the control gear.

The invention also relates to an assembly comprising an LED module that has a light source and an electric circuit, wherein the control gear comprises at least one energy transmission element, preferably an inductive element, and wherein the electric circuit has an inductive coupling element, which is disposed in a magnetic or electromagnetic stray field of the energy transmission element.

The electric circuit can comprise a voltage supply means configured for generating a supply voltage for the electric circuit from energy absorbed from the magnetic or electromagnetic stray field.

The electric circuit can be configured for sending and receiving wireless signals, in particular radio signals.

The invention shall be explained in greater detail below on the basis of exemplary embodiments and the drawings.

DETAILED DESCRIPTION

In the figures, identical reference symbols indicate identical or similar elements. Repetition shall be substantially avoided for reasons of clarity in the following description of exemplary embodiments.

Figure 1:
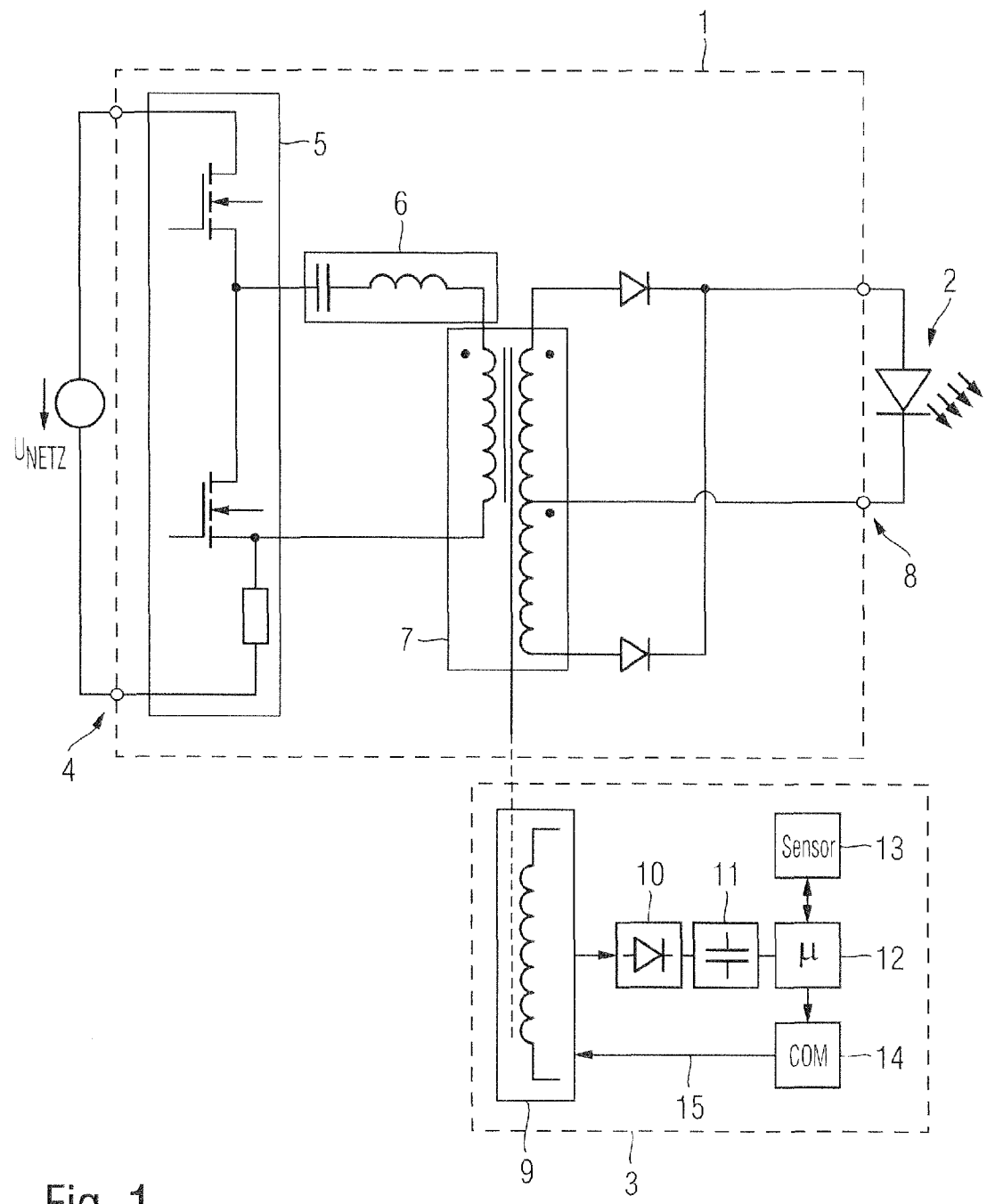
FIG. 1 shows a schematic illustration of an assembly according to the invention, comprising control gear and an electric circuit.

An assembly according to the invention corresponding to a first exemplary embodiment of the invention is shown in FIG. 1. The assembly comprises control gear 1 for operating a lamp 2, and an electric circuit 3. A lamp 2 in the form of an LED is shown in FIG. 1. Without deviating from the invention, it is likewise possible for the control gear 1 to supply numerous lamps 2, which in turn comprise numerous light emitting elements, such as LEDs, gas discharge lamps, etc., with energy.

The invention shall be explained using an LLC converter by way of example, for operating at least one lamp, e.g. an LED series. Driver circuits for operating light emitting diodes are known. By way of example, converters with an LLC circuitry are used as driver circuits, hereinafter referred to as LLC converters. With LLC converters, a (serial) resonance circuit is supplied with a high-frequency AC voltage by means of a high-frequency pulsed half-bridge circuit 5. The resonance circuit supplies a primary-side transformer coil. A secondary-side transformer coil then directly supplies a lamp. The supply voltage supplied to the lamp is typically a DC voltage. As a rule, the DC voltage can be generated by a rectifier circuit. It is advantageous, however, to carry out the rectification by means of a transformer with a center tap on the secondary coil.

The LLC converter is thus an electric circuit, which is supplied at the input by a mains alternating voltage, and can be connected to the lamp, e.g. one or more LEDs, and provides a DC voltage at the output for a defined mode of operation.

The control gear 1 shown in FIG. 1 has an input 4. An input voltage is applied to the input 4, which can preferably be a rectified mains input voltage $U_{NETZ}$. The mains input voltage $U_{NETZ}$ can also be rectified, for example, and then a power factor correction circuit PFC (not shown) can be incorporated, which provides a stabilized DC voltage for the LLC converter. The control gear 1 is depicted as an LLC converter. This is followed, seen from the input 4, by a half-bridge circuit 5 and a subsequent series resonant circuit 6. The LED output 8 is subsequently supplied with energy via a transformer 7. The output voltage $U_{LED}$ for the lamp 2 is provided at the LED output 8.

An AC voltage or an alternating current is generated by the half-bridge circuit 5 in the control gear 1 shown therein, and conducted to the series resonant circuit 6. The energy provided as AC voltage oscillates in a resonant circuit, and is delivered, at least in part, to the load of the transformer 7.

The series resonant circuit of the LLC converter is composed in general of a capacitor C, and inductor L and a further coil L'. The further coil L' is able to transfer the energy provided by means of the AC voltage to the lamp 2 acting as a load. In order to be able to transfer the energy, the load is coupled to the series resonant circuit 6 via the transformer 7. The transformer 7 serves as a galvanic barrier between the generated AC voltage and the DC voltage supplied to the lamp.

The transformer 7 ensures a galvanic separation between the input-side section that has a higher voltage and an output-side section with a low-voltage supply voltage for the lamp 2. A potential barrier is thus implemented by the transformer 7 for a protective separation, also referred to as a SELV barrier. A primary-side input alternating current in the transformer 7 generates a magnetic alternating field, by which an output alternating current is formed in the secondary-side coils. These are the primary-side input coil and the at least one secondary-side output coil, wherein two output coils are illustrated in FIG. 1, which are formed on a magnetic or iron core with higher magnetic conductivity (permeability) μ. The power transfer between the primary side and the secondary side substantially takes place via a magnetic alternating field, via the flux Φ in the magnetic core of the transformer.

Additional auxiliary voltages are normally generated on the magnetic core via auxiliary windings, which supply control gear control circuits with electrical energy via supply lines.

The transformer 7, however, has not only a magnetic flux Φ in the magnetic core, which flows in a targeted manner from the primary windings through the secondary windings of the transformer, but also a magnetic stray flux $\Phi_S$. A magnetic stray flux $\Phi_S$ is formed as a result of the necessary spacing between numerous windings of the transformer. The magnetic stray flux $\Phi_S$ is caused by the primary winding, but does not permeate the secondary coils. As a result, this stray flux $\Phi_S$ does not does not contribute to the magnetic coupling of the primary side with the secondary side of the transformer 7. The magnetic stray flux $\Phi_S$ is therefore to be understood as "flux loss." This magnetic stray flux $\Phi_S$ can be reduced by winding the transformer 7 with copper foil. This reduces the power losses in the transformer 7.

In accordance with the invention, an inductive coupling element 9 is disposed in the region of the magnetic stray flux $\Phi_S$ of the transformer 7. This inductive coupling element 9 can be formed, for example, as at least one conductor loop, or take the form of an antenna of a suitable design. A current is induced in the inductive coupling element 9 by the magnetic stray flux $\Phi_S$, which can then be used for supplying voltage to the electric circuit 3. With the assembly according to the invention, stray energy of, e.g., 1 to 4 watts, can be obtained from the magnetic or electromagnetic stray field for supplying active electric circuits that only have a low power consumption.

The discussion above relates the voltage supply according to the invention on the basis of the magnetic field or inductances. This approach applies in the same manner to electromagnetic fields. The term "inductive coupling element 9" means the same as "antenna" thereby. An example of a use according to the invention of an electromagnetic field shall be explained below in reference to FIG. 5.

The electric circuit 3 according to the exemplary embodiment in FIG. 1 also comprises, in addition to an inductive coupling element 9, a voltage supply means, comprising a rectifier 10 and a capacitor 11. The rectifier 10 receives an AC voltage from the inductive element 9 induced in the inductive coupling element 9, and generates a low-voltage DC voltage through rectification with a suitable voltage level, for supplying a control circuit 12. This low-voltage DC voltage is applied to a storage means 11, which smooths this low-voltage DC voltage by bypassing voltage peaks, for example, and stores electrical energy.

The storage means 11 is preferably implemented as a capacitor. In particular, a capacitor that has a higher energy density is suitable as the storage means 11. A double-layer capacitor, also referred to as an electrochemical double-layer capacitor (EDLC) or super capacitor ("Goldcap"™), can be used to particular advantage as the storage means 11.

The electric circuit 3 according to FIG. 1 comprises a sensor 13, which is supplied with voltage via the control circuit 11. A measured value recorded by the sensor, e.g. for a physical parameter that is to be recorded, such as brightness, is recorded by the control circuit 12, temporarily stored in accordance with an exemplary embodiment, and/or sent to a first communication means 14 in the form of recorded sensor data.

The first communication means 14 according to an advantageous exemplary embodiment is configured to transmit sensor data to the control gear 1 in the form of a sensor signal, by way of example. The first communication means 14 of one exemplary embodiment comprises a modulator for this. The first communication means 14 can furthermore comprise line drivers for transmitting the sensor signal to the control gear 1 by means of special sensor signal lines. The first communication means 14 in a further exemplary embodiment comprises a bus driver for transmitting the sensor data via a bus, in particular a DALI bus. The electric circuit 3 according to FIG. 1, on the contrary, displays a sensor signal line leading from the first communication means 14 to the inductive element 9. The first communication means 14 according to FIG. 1 is configured for wireless transmission of a signal to the control gear 1, e.g. through a special transmission inductance or through suitable modulated pulsing of a signal by the inductive coupling element 9.

The control gear 1 according to one embodiment of the teachings according to the invention comprises a second communication means, not shown in FIG. 1. The second communication means is configured to receive the signal with the sensor data and/or other data such as control data, status data, etc., to demodulate the signal, extract the transmitted information and/or sensor data, and further process said data in the control gear 1, and/or transmit this data to other receivers by the control gear.

Figure 3:
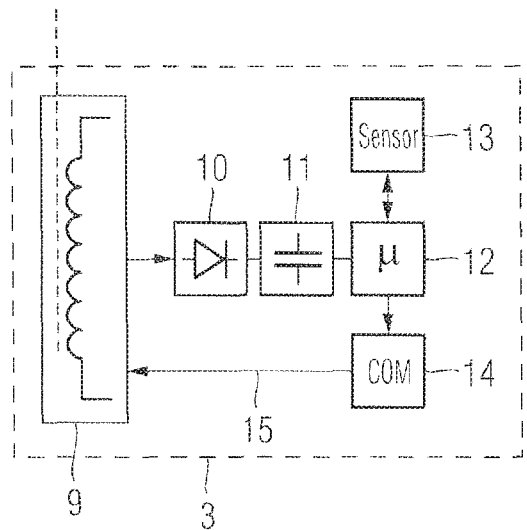
FIG. 3 shows a schematic illustration of an electric circuit according to the invention in a first exemplary embodiment.
Figure 4:
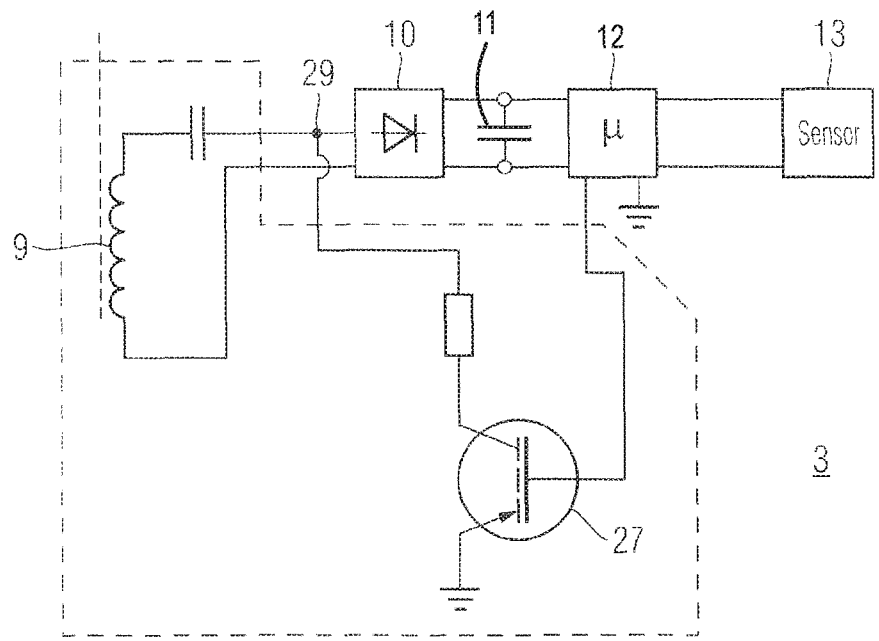
FIG. 4 shows a schematic illustration of an electric circuit according to the invention, in a second exemplary embodiment.

Exemplary embodiments of the invention that have different configurations of the communication channel for signal transmission between the control gear 1 and the electric circuit 3 shall be explained in greater detail in reference to FIGS. 3 and 4.

First, two views of an assembly according to the invention are shown in accordance with a first exemplary embodiment of the invention. An assembly according to the invention is shown from above in the upper illustration in FIG. 2, comprising the control gear 1 and the electric circuit 3.

Figure 2:
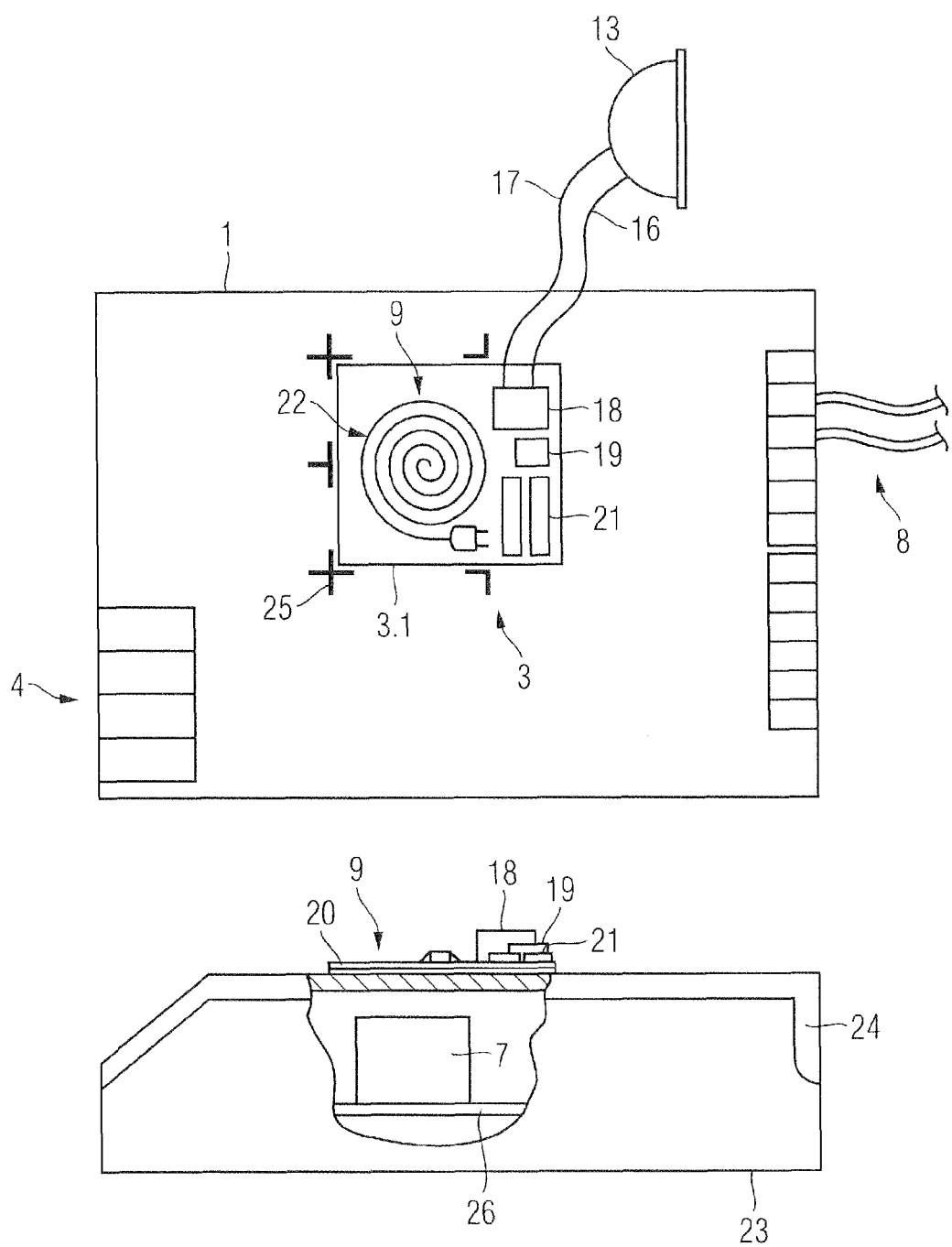
FIG. 2 shows a view of an assembly according to the invention, comprising control gear and an electric circuit.

The electric circuit 3 in FIG. 2 connects the sensor 13, e.g. a movement sensor, via two sensor lines 16, 17. These sensor lines 16, 17 can supply the sensor 13 with voltage, as well as transmit sensor signals (sensor data) to the main assembly 3.1 of the electric circuit 3. The main assembly 3.1 of the electric circuit 3 is depicted in FIG. 2 as an electric circuit 3 in the form of a printed circuit board 20 with components 18, 19, 21 attached thereto. The printed circuit board 20 also has a conductor path structure 22, shown in the upper illustration in FIG. 2, which forms the inductive coupling element 9.

In contrast to the illustration in FIG. 2, the electric circuit 3 is preferably disposed in its own circuit housing. It is particularly preferred that this circuit housing can be permeated by magnetic fields with low permeation losses, at least in the region of the magnetic coupling element 9. This circuit housing can also only partially cover the electric circuit 3. In this manner, the circuit housing can be formed such that it only covers an upper surface of the electric circuit 3, which is not protected by the housing lid 24.

The housing lid 24 in one embodiment of the invention also has a marking 25 on its upper surface. The upper surface of the housing lid 24 is that surface of the housing lid 24 that faces outward after the housing lid 24 and the housing 23 have been assembled. The marking 25 can indicate a region on the housing lid 24 as a colored or tactile marking. When the inductive coupling element 9 is placed on this marked region of the housing lid 24, the magnetic coupling element 9 can obtain a particularly high stray power from the magnetic or electromagnetic stray field. The marking 25 can be formed according to another exemplary embodiment such that it can serve, at least in part, as a mechanical attachment for the electric circuit 3 on the housing lid 24. This can be achieved, for example, by forming track-like guides on the upper surface of the housing lid 24.

The circuit housing of the electric circuit 3 or the printed circuit board 20 can be attached to the housing 23 or to the housing lid 24 by means of, e.g., screws or adhesive, as shown in FIG. 2. An at least additional bonding of the electric circuit 3 to the housing 23 is exerted toward the housing lid 24 by the magnetic force of the inductive element (transformer) 7 on the electric circuit 3.

A side view of the assembly according to the invention, comprising control gear 1 and an electric circuit 3 is shown in a partial section in the lower illustration in FIG. 2. The housing 23 is shown thereby in a region of the lower illustration, such that the spatial arrangement of the transformer 7 on a main printed circuit board 26 of the control gear 1 can be discerned. It can be seen from the lower illustration in FIG. 2 that the inductive coupling element 9 is disposed directly above the transformer 7, but on the exterior of the housing 23 with the housing lid 24 for the control gear 1. In this manner, a particularly beneficial placement of the inductive coupling element 9 is achieved with respect to the energy that is to be obtained from the stray field of the transformer 7.

A schematic illustration of an electric circuit corresponding to a first exemplary embodiment of the invention is shown in FIG. 3. A communication channel is created in the form of a feedback channel, between the electric circuit 3 and the control gear 1. This communication channel is supplied with power by the electric circuit through a first communication means 14. The first communication means 14 can comprise a modulator for generating a transmission signal through modulation of the transmitted data on a data carrier for this. The transmission signal is transmitted via special data lines, wirelessly via a bus, in particular via a DALI bus, or wirelessly to the control gear 1 and/or further receivers, e.g. a central lighting control unit. The first communication means 14 can also comprise, for example, conductor drivers for transmitting the sensor signal by means of special sensor signal lines to the control gear 1. The first communication means 14 in a further exemplary embodiment comprises a bus driver for transmitting the sensor data via a bus, in particular a DALI bus.

A schematic illustration of an electric circuit according to the invention is shown in FIG. 4, corresponding to an advantageous second exemplary embodiment of the invention. The electric circuit 3 according to FIG. 4 has a switch 27 in this example. The switch 27 is activated by the control circuit 12, and accordingly enables the transmission of data, e.g. sensor data from the sensor 13. By activating the switch 27, which can be implemented, e.g., by a transistor, the load at an output 29 of the inductive element 9 is effectively modified. In this manner, a modulation of the load to the inductive element 9 is achieved through the pulsing of the inductive element 9 by the switch 27, depending on the switching signal emitted by the control device 12. The control device 12 can thus transmit sensor data from the sensor 13 to control device (not shown) of the control gear 1. The first communication means 14 is thus configured to wirelessly transmit sensor data to the control gear 1, without the need for a separate data line from the electric circuit 3 to the control gear 1, and without using conventional methods for wireless data transfer.

In this manner, a particularly advantageous arrangement of one or more sensors 13, in conjunction with at least one control gear 1 for lamps 2, is realized, which requires only a little additional circuitry and installation effort for supplying current and for signal transmission.

The communication channel between the control gear 1 and the electric circuit 3 can also be bidirectional. The first communication means 14 and the second communication means are then suitable for use in a duplex mode of operation.

Figure 5:
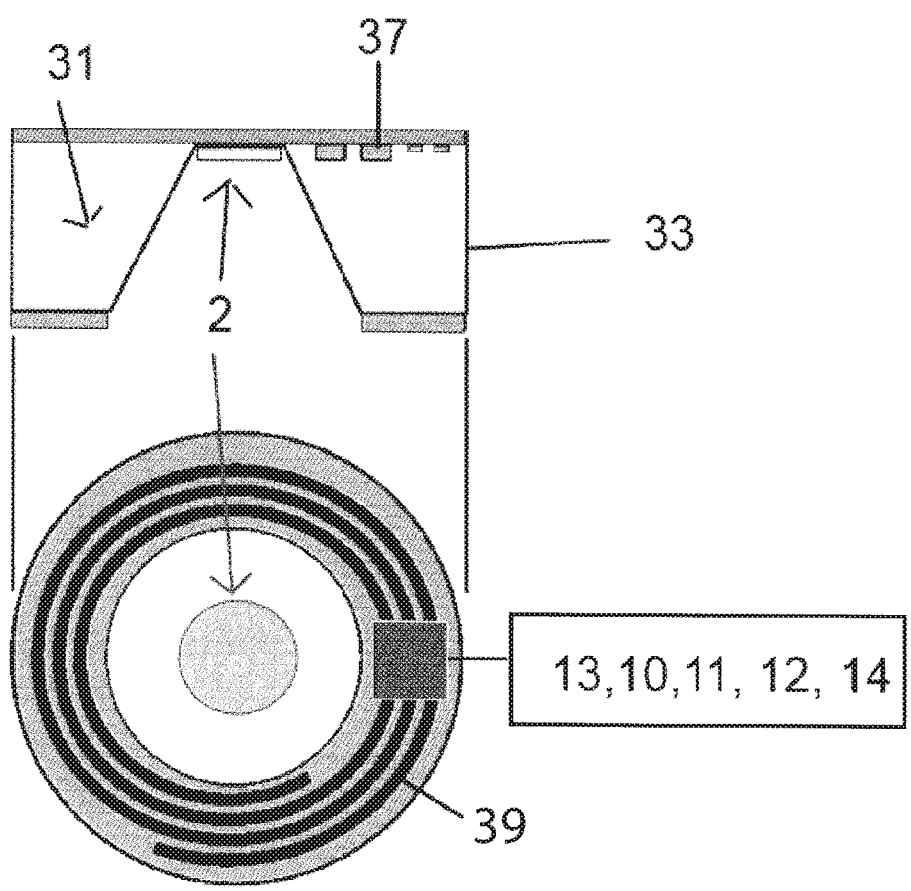
FIG. 5 shows another exemplary embodiment according to the invention.

An assembly according to the invention corresponding to another exemplary embodiment of the invention is shown in FIG. 5. The assembly comprises an LED module 31 that has integrated control gear for operating a lamp 2, and an electric circuit 3.

A lamp 2 in the form of an LED is shown in FIG. 5. The example in FIG. 5 shows both a side sectional view of an LED module (above) as well as a top view of the LED module (below).

This example in FIG. 5 shows an LED module 31 with an integrated control gear (not shown). The control gear can have a driver switch for operating at least one lamp, e.g. an LED series. Driver switches for operating light emitting diodes are known. By way of example, a buck converter or a buck/boost converter can be used as the driver switch. The driver switch can be configured, for example, such that it supplies the LED with a constant current.

The electric circuit 3 with the sensor 13 can be constructed similarly to the examples above, and can preferably comprise control device 12, a rectifier 10 and a capacitor 11, as well as a first communication means 14.

The transformer 37 ensures a galvanic separation between the input-side section, which has a voltage connected to the input mains supply, and an output-side section that has a low-voltage supply voltage for the sensor 13, which is potentially separated from the input mains supply. A potential barrier, also referred to as a SELV barrier, is thus realized by means of the transformer, to form a protective separation. The transformer 37 is configured as a core-less transformer, in which the primary winding and the secondary winding are preferably formed through planar technology.

A primary-side input alternating current, preferably with a higher frequency, e.g. in the range of 1 to 20 MHz, generates an electromagnetic alternating field in the transformer 37, which creates an output alternating current in the secondary coil. The primary-side input coil is disposed inside the housing 33 of the LED module 31. The at least one secondary-side output coil in the form of an inductive coupling element 39 is disposed outside the housing 33 of the LED module. By way of example, the secondary-side output coil can be disposed on a foil or printed circuit board as part of the electric circuit, which is attached to the LED module, e.g. by means of adhesive.

The power transfer between the primary side and the secondary side takes place substantially via an electromagnetic alternating field, via the magnetic flux of the transformer. The transformer 37, which has the secondary-side output coil serving as the inductive coupling element 39, is not formed by an integrated component in this example, but rather by the primary winding and the secondary-side output coil, which are spatially separated from one another, such that the secondary-side output coil can be removed from the LED module 31 and thus from the primary winding; the configuration is such, however, that a power transfer between the primary side and the secondary side via an electromagnetic alternating field can be implemented.

An inductive coupling element 39 is disposed according to the invention in the region of the electromagnetic field of the primary winding of the transformer 37. This inductive coupling element 39 can be formed, for example, as at least one conductor loop, or in the form of an antenna with an appropriate design. A current is formed in the inductive coupling element 39 by the magnetic stray flux, which can then be used for supplying the electric circuit 3 with voltage.

By way of example, the LED module also contains, in addition to the driver circuit for the LED, a pulse circuit for activating and supplying the primary winding of the transformer 37, thus the energy transfer element, with a higher frequency. This pulse circuit can be supplied with energy from an internal DC voltage, or form the supply current for the LED.

In an optional variation, both energy as well as data can be transmitted to the electric circuit 3 via the transformer 37 through appropriate pulsing by means of the pulse circuit. In this manner, the pulse circuit and the transformer 37 can be a part of the communication channel between the control gear 1 and the electric circuit 3.

The electric circuit 3 can also have a modulator, which can be configured to pulse the secondary-side output coil serving as an inductive coupling element 39, and thus form a first communication means. In this manner, bidirectional communication can also take place via the transformer 37.

The LED module can thus be provided with an attachment, for example, wherein the attachment contains the electric circuit 3. The sensor 13 of the electric circuit 3 can contain a movement sensor and/or a brightness sensor, for example. The attachment with the electric circuit 3 can be constructed such that it can be placed on the LED module, without affecting or limiting the light emission of the LED. In the example according to FIG. 5, the attachment is annular, and can be attached to the rim of a round LED spotlight module such that the sensor 13 can function, because it can be located in the beam direction of the LED module, without affecting or limiting the light emission of the LED.

According to a further development of the invention and the exemplary embodiments described above, the electric circuit 3 can also have an additional or alternative third communication interface. This third communication interface can be configured, for example, as a third communication interface for outputting and receiving wireless signals, in particular radio signals. By way of example, the third communication interface can be configured to receive radio signals in accordance with a defined standard, e.g. Bluetooth, WLAN, or Zigbee. The wireless signals can be exchanged by the electric circuit 3, for example, with other devices, e.g. additional control devices or loads, without having to involve the control gear in this communication. In this manner, it is possible to provide an electric circuit 3 with a sensor 13, which is supplied with energy via a contactless energy transfer, and is configured for outputting and receiving wireless signals, in particular radio signals.

Parts of the electric circuit 3 according to the exemplary embodiments can also be integrated in an integrated circuit. By way of example, the control device 12, the rectifier 10, and, optionally, the first communication means 14 can be combined in an integrated circuit. It is also possible to integrate the sensor 13 in the integrated circuit. The integrated circuit can be configured, for example, as a multi-chip module or single-chip module.

The features explained above can be advantageously combined with one another in the framework of the invention defined in the claims.

What is claimed is:

1. An assembly comprising lamps (2), control gear (1) for the lamps (2) and an electric circuit (3), wherein the control gear (1) comprises at least one energy transmission element (7, 37) comprising a core, a primary-side input coil and at least one secondary-side output coil, where the primary-side input coil transmits power to the at least one secondary-side output coil through the core, and wherein the electric circuit (3) comprises:
   an inductive coupling element (9, 39), which is disposed in a magnetic or electromagnetic stray field of the primary-side input coil of the energy transmission element (7, 37) to receive low level power from the primary-side input coil in the stray field when the control gear is transmitting power through the core and the at least one secondary-side output coil to power the lamps;
   voltage supply circuit (10, 11) configured to generate a low level supply voltage for the electric circuit (3) from energy absorbed from the stray field;
   a motion or brightness sensor that provides data to control the operation of the lamps;
   a controller;
   a switch in the electric circuit that modifies the load from the primary-side input coil through the stray field only to the inductive coupling element of the electric circuit when activated, wherein the controller emits a signal to pulse the switch and modulate the load to the inductive coupling element and the controller is configured to communicate with the control gear by modulating the load to the inductive coupling element from the primary-side input coil through the stray field only in order to transmit sensor data from the sensor to the control gear.

2. The assembly according to claim 1, wherein the electric circuit (3) further comprises a resistor connected between the inductive coupling element and a first side of the switch wherein a second side of the switch is connected to ground.

3. The assembly according to claim 1 wherein the electric circuit (3) comprises a rectifier and a capacitor (11) located between the inductive coupling element and the controller.

4. The assembly according to claim 2 wherein the energy transmission element (7, 37) is activated in a pulsed operating mode.

5. The assembly according to claim 1 wherein the control gear is integrated in an LED module (31).

6. An assembly comprising lamps (2), control gear (1) for the lamps (2) and an electric circuit (3) for a motion or brightness sensor, wherein:
- the control gear (1) comprises an energy transmission element (7, 37) comprising a primary-side input coil and at least one secondary-side output coil, and a first housing with a housing lid in which at least the energy transmission element is contained; and
- the electric circuit (3) comprises a main assembly on a printed circuit board, the motion or brightness sensor, sensor lines connecting the sensor to the main assembly and a second housing for the main assembly of the electric circuit, and the main assembly of the electric circuit (3) on the printed circuit board comprises an inductive coupling element (9, 39) which is disposed in a magnetic or electromagnetic stray field of the primary-side input coil of the energy transmission element (7, 37) to receive low level power form the primary-side input coil in the stray field, voltage supply circuit (10, 11) configured to generate a low level supply voltage for the electric circuit (3) from energy absorbed from the stray field, a controller, and a switch that modifies the load to the inductive coupling element of the electric circuit when activated, wherein the controller emits a signal to pulse the switch and modulate the load to the inductive coupling element and the controller is further configured to communicate with the control gear by modulating the load to the inductive coupling element from the primary-side input coil through the stray field in order to transmit sensor data from the sensor to the control gear; and
- further wherein the electric circuit (3) comprises a second housing in which the components of the main assembly of the electric circuit on the printed circuit board are contained, the second housing being connected to the housing lid so that the inductive coupling element (9) of the electric circuit (3) is disposed on or near the housing lid (24) of the first housing and is located within the stray power field of the primary-side input coil of the control gear contain in the first housing (23).

* * * * *